ial No. 582,940

2,831,870
PRODUCTION OF ETHYLENE OXIDE

Willard J. McClements, Hopewell, and Dale E. Elliott, Chesterfield, Va., assignors to Allied Chemical & Dye Corporation, New York, N. Y., a corporation of New York No Drawing. Application May 7, 1956
Serial No. 582,940

6 Claims. (Cl. 260—348.5)

This invention relates to the production of ethylene oxide by direct oxidation of ethylene with oxygen and more particularly refers to a method for the oxidation of ethylene to ethylene oxide at superatmospheric pressure in the presence of a new and improved silver catalyst.

The oxidation of ethylene to ethylene oxide is generally carried out by passing a mixture of ethylene and an oxygen-containing gas through tubes containing a supported silver catalyst maintained at a temperature between about 225° C. and 300° C. The temperature of the catalyst is controlled by a liquid bath of molten salt or high boiling organic liquid surrounding the catalyst tubes. Reactors comprising catalyst tubes and surrounding liquid baths for use in the oxidation of ethylene to ethylene oxide are illustrated in British patent specification 724,452, published February 23, 1955.

Processes for the direct catalytic oxidation of ethylene to ethylene oxide in the presence of a silver catalyst may be divided into a low pressure process, i. e. ethylene oxidation at pressures below 100 p. s. i. g. (pounds per square inch gauge), and a high pressure process, i. e. ethylene oxidation at pressures above 100 p. s. i. g. (pounds per square inch gauge), more generally within the range of 150 to 250 p. s. i. g. In both high pressure and low pressure processes for the catalytic oxidation of ethylene to ethylene oxide, there is a tendency for a temperature gradient to develop in the catalyst bed with localized hot spots therein and consequent production of substantial quantities of undesired by-products and impairment of the catalyst to produce ethylene oxide. In the low pressure process, the addition of a chloride inhibitor, such as a chlorinated polyphenyl compound or ethylene dichloride, has been found effective in reducing the temperature gradient and hot spots in the catalyst bed. In operation at high superatmospheric pressures in multitube pressure reactors, it was found that the addition of chloride inhibitors is an amount sufficient to eliminate hot spots and to produce more uniform temperature conditions in the catalyst bed also materially reduce the activity of the catalyst, resulting in low ethylene oxide yields. Because of low ethylene oxide yields resulting from the high pressure oxidation of ethylene to ethylene oxide, the advantages inherent in the use of high pressure processes were not fully realized and utilized. Operation of the catalytic direct oxidation process to produce ethylene oxide at high superatmospheric pressure of about 150 p. s. i. g. or above permits use of smaller size equipment and amount of catalyst required and facilitates the recovery of ethylene oxide from the reaction products.

An object of the present invention is to provide an efficient process for converting ethylene to ethylene oxide under high superatmospheric pressure by direct oxidation with elemental oxygen in the presence of a silver catalyst.

Another object of the invention is to provide a continuous process for oxidizing ethylene to ethylene oxide at high superatmospheric pressure in a multitube pressure reactor containing silver supported catalyst having a uniform activity.

A further object of this invention is to provide a new and improved silver catalyst having a uniform and high activity. A still further object is to provide a method for preparing a uniform high reactive silver catalyst adapted for use in the conversion of ethylene to ethylene oxide by direct oxidation with elemental oxygen in the presence of such silver catalyst in multitube pressure reactor maintained under high superatmospheric pressure.

Other objects and advantages will be apparent from the following description.

The direct oxidation of ethylene with oxygen to produce ethylene oxide is an exothermic reaction generating an appreciable amount of heat. The side reaction in such processes, resulting in the complete oxidation of ethylene to carbon dioxide and water, is even more highly exothermic and produces a great deal of heat. Unless this exothermic heat can be rapidly dissipated, the temperature of reaction will rise, by-product formation will increase and catalyst deterioration will result. One of the methods of controlling the reaction is to carry out the reaction in a multitube reactor which is simply a plurality of parallel thin wall tubes about 15 to 25 feet long, usually less than 2 inches in diameter and more generally about 1 inch in diameter, which tubes are filled with pellets of a supported silver catalyst through which the gaseous reactants, ethylene and oxygen in an inert gaseous medium, are passed and which tubes are surrounded by a liquid bath for extracting the exothermic heat of reaction and regulating the temperature of the reaction. Despite the employment of a plurality of long thin wall tubes surrounded by a liquid bath for controlling the temperature of reaction in the tubes containing the catalyst, there developed hot spots and temperature gradients in the catalyst bed with consequent lowering of ethylene oxide yield and increase in by-product formation. The addition of an inhibitor, as for example ethylene dichloride or a chlorinated polyphenyl compound, in small amount has been suggested for controlling the ethylene oxide reaction. In low pressure operations, that is conversion of ethylene to ethylene oxide under a superatmospheric pressure below 100 p. s. i. g., the addition of a chloride inhibitor is very effective in maintaining a more uniform catalyst bed temperature and minimizing hot spots. Unfortunately the addition of a chloride inhibitor to the catalyst in a high pressure process, i. e. superatmospheric pressure above 100 p. s. i. g., generally between 150–250 p. s. i. g., has limited benefits and does not give complete control of hot spots and temperature variations in the catalyst bed. The addition of a chloride inhibitor in amount sufficient to eliminate the hot spots in the high pressure operations would reduce the activity of the catalyst to such an extent that the operation would be inefficient.

Experimentation was conducted for the purpose of determining the cause of the inefficiency in the high pressure operations for the production of ethylene oxide and methods for overcoming such difficulty. In a series of tests, it was noted that in operation at high superatmospheric pressures, the several reactor tubes oxidized ethylene at different rates with the catalyst in some tubes generating hot spots and in other tubes the catalyst having such low activity as to be extremely inefficient. The relative uniformity between the tubes was improved by use of inhibitors, but this reduced the activity of the catalyst with consequent lowering of ethylene oxide. Actual experience has shown that commercial multitube reactors are operated at a relatively low rate to avoid hot spots in tubes containing more active catalyst. In short, we found that one of the prime reasons for inefficient operation for the production of ethylene oxide in multitube reactors under high superatmoshperic pressure is a result of a lack of uniformity of the catalyst in the several tubes. After extended investigation, we found that the lack of uniformity of the catalyst activity and the hot spots were due to three factors: (1) uneven distribution of silver on the catalyst support; (2) non-uniform temperature conditions existing during activation of the catalyst, and (3) separation of silver from handling the activated catalyst prior to and during loading in the reactor.

Silver surface catalysts were produced by precipitating silver oxide, depositing the silver oxide on a suitable carrier, drying and then activating the catalyst. Precipitation of silver oxide may be accomplished by treating a water-soluble silver salt, such as silver nitrate or silver acetate, with a hydroxide which can be removed from the precipitated silver oxide. Preferably, silver nitrate is reacted with sodium hydroxide. Instead of sodium hydroxide, potassium hydroxide, barium hydroxide, tetramethyl ammonium hydroxide or ammonium hydroxide may be employed. Irrespective of the reagent used to form the precipitate of silver oxide, the precipitate should be washed carefully to effect removal of impurities, such as residual sodium compounds. The removal of such impurities can usually be effected by washing the precipitated silver oxide with water. Barium lactate or other promoters are added to the precipitated silver oxide, if desired.

The next step in the preparation of the catalyst is coating the support. Any of the known carriers employed in the production of silver surface catalysts used for catalyzing olefin to olefin oxide reaction may be used. Silica, fused alumina refractory materials, and beryllium oxide, including Alusite and Alundum, of a convenient size, say ⅛" to ½", preferably ⅜", may be used as the carrier. An alumina carrier, such as Alundum, is preferred. The conditions for coating the catalyst with silver oxide are critical. The support should be coated at a temperature above 90° C. and below 100° C., preferably 95°±2° C. Lower temperatures result in uneven distribution of silver oxide on the support and poor adherence of the oxide to the support. Higher temperatures result in reduced activity of the catalyst and excessive formation of silver oxide dust. Water is added to the precipitated silver oxide to form a thick slurry. The silver oxide slurry is added to the catalyst support at a rate correlated with the heat supplied to maintain the temperature at about 95° C. A convenient apparatus for coating the catalyst support is a rotating drum heated by a gas burner, into which the support is charged and silver oxide slurry added. The amount of silver coating on the catalyst may vary from about 8–20% and preferably is within the range of 10–15%. After coating, the catalyst may be dried in a conventional drier oven at a temperature of about 100–130° C.

The next step in the operation is catalyst activation. That the silver catalyst must be activated by converting the silver oxide thermally to metallic silver is known. This is generally accomplished on commercial scale by treating the catalyst in large trays for several hours in a forced draft hot air oven at about 400° C. In this method of activation, we found large variations in temperature, as much as 100° C. or more, exist in the activation oven. Furthermore, there is a relatively large separation of silver from handling the activated catalyst prior to and during loading in the reactor. The powdered silver tends to cause higher pressure drop and a tendency to hot spot during ethylene oxidation. We have discovered that the activity of a catalyst is affected by the temperature to which it has been subjected. Silver, reduced at a temperature below 350° C., exists in a very finely divided crystalline state. These crystals grow with increase in temperature and the activity of the catalyst is thus reduced. Perhaps more important, when a catalyst is activated in large batches in an oven in which there is a wide variation in temperature, there results a wide variation in its activity. This lack of uniformity results in lower yields of ethylene oxide in plant operation and greater operating difficulties.

We have found it most important, in order to produce uniformly, highly active silver catalyst, to effect the activation of the coated silver catalyst at a uniform temperature, i. e. a temperature which does not vary more than ±5° C. during the activation and further, that such temperature be within the range of 250–340° C., preferably within the range of 285–315° C. We have found that by activating the catalyst in tubes using a liquid bath as the heating medium, uniformity of temperature with resulting uniformity of catalyst activity can be obtained.

We have also found that loss of silver in handling the catalyst is minimized if the catalyst is charged to the reactor in the oxidized state prior to activation. The silver oxide adheres more firmly to the support than silver in the reduced state. Furthermore, any residual moisture left in the oxide coating acts to prevent the chipping off of the coating when the catalyst dropped into the reactor tubes.

The activation of the catalyst is preferably carried out in the following manner. The catalyst is loaded in the reactor tubes and the heads of the reactor are left off to permit air circulation via chimney action through the tubes. The temperature of the bath surrounding the tubes is gradually brought to the activation temperature. To produce an active catalyst, the temperature should be held at about 300° C. for a period of from three to twelve hours, preferably from six to ten hours. When barium lactate promoter is used, activation is continued until the odors of the organic vapors from decomposition of the lactate have disappeared. Following the activation, the heads are replaced on the reactors, the temperatures of the bath reduced to about 225–240° C., and the catalyst is ready for operation.

The advantages in the use of this new method of activation are illustrated in the following examples:

*Example 1*

A catalyst was prepared by precipitating silver oxide from a solution of silver nitrate and coating this oxide on a suitable support. A 4.8% solution of sodium hydroxide containing 40.5 lbs. sodium hydroxide was added slowly with vigorous stirring to a 15.9% solution of silver nitrate containing 153.5 g. $AgNO_3$. The oxide formed was thoroughly washed after which it was allowed to settle and the supernatant liquor siphoned off. A barium lactate solution was prepared just before use by adding 17.9 lbs. of $Ba(OH)_2.8H_2O$ to 12.55 lbs. of 85% lactic acid. This solution was added directly to the oxide slurry with stirring. Five hundred pounds of support was then charged to a rotating drum and heated to 94° C. by a gas burner. The tumbling support was sprayed with the oxide slurry while maintaining the temperature of the support at 94–96° C. After addition of the slurry was complete, the burner was shut off and the catalyst removed from the coater and transferred to a drying oven where the catalyst was dried at 130° C. for several hours.

*Example 2*

Three samples of catalyst prepared as in Example 1 were activated at 300, 400, and 500° C., respectively, in a laboratory hot air oven where temperatures could be maintained relatively uniform. The activated samples were then charged to separate tubes in a three-tube intermediate scale ethylene oxidation reactor. The reactor bath temperature was maintained at 255° C. Operating the reactor at 6000 hr.$^{-1}$ space velocity with a gas stream containing less than 1 p. p. m. chloride inhibitor, 3.5% $C_2H_4$ and 4.5% $O_2$, and the balance essentially inerts, the following results were obtained at a pressure of 180 p. s. i. g.

| Temperature of Activation, °C. | Percent Exit Oxide |
|---|---|
| 300 | 0.83 |
| 400 | 0.57 |
| 500 | 0.47 |

These data indicate that as the temperature of activation was increased from 300 to 500° C. the activity of the catalyst declined about 43%.

*Example 3*

Three samples of catalyst prepared as in Example 1 were activated in different positions in a commercial scale forced draft activation oven at a nominal temperature of 400° C. Catalyst temperatures in the activation oven, one hour after the oven had reached 400° C., varied as much as 80° C. from top to bottom. Temperatures were measured simultaneously by suitable thermocouples placed at 12 positions in the oven. After activation the three samples were charged to separate tubes in a three-tube ethylene oxidation reactor operated at 180 p. s. i. g., 260° C. bath temperature and 6000 hr.$^{-1}$ space velocity using gas containing less than 1 p. p. m. chloride inhibitor, 3.5% $C_2H_4$ and 4.5% $O_2$ and the balance essentially inerts. The following results were obtained:

| Catalyst Position in Activation Oven | Percent Exit Oxide |
|---|---|
| Top | 0.66 |
| Center | 0.69 |
| Bottom | 0.80 |

The bottom sample was most active due to the lower activation temperature at this level in the oven.

*Example 4*

This example demonstrates the preferred process of the invention. Three samples of catalyst prepared as in Example 1 were charged to three tubes of an ethylene oxidation reactor. The reaction tubes were one inch in diameter, 22 feet in length, and surrounded by a tetralin bath used as a heating medium. The heads of each of the reactor tubes were left off in order to permit air circulation through the tubes by chimney action during the catalyst activation. The catalyst was activated by raising the temperature of the tetralin bath to 300° C. and maintaining this temperature for six hours. At the end of this period the heads were replaced on the reactor and the bath temperature reduced to 230° C. The catalyst was then ready for operation.

The ethylene oxidation reactor tubes were operated at 180 p. s. i. g. and 7080 hr.$^{-1}$ space velocity with a gas stream containing less than 1 p. p. m. chloride inhibitor, 4.5% ethylene, 5% oxygen and the balance essentially inerts. The temperature of the tetralin bath was slowly advanced to 250° C. After several hours of operation the ethylene oxide content of the gases exit each of the three tubes was determined, with the following results:

| Sample Tube | Percent Exit Oxide |
|---|---|
| 1 | 0.73 |
| 2 | 0.70 |
| 3 | 0.71 |

Thus, the catalyst activated in this manner gave more uniform activity values.

Although certain preferred embodiments of the invention have been disclosed for purpose of illustration it will be evident that various changes and modifications may be made therein without departing from the scope and spirit of the invention.

We claim:

1. A method for preparing uniformly, highly active silver catalyst adapted for use in the conversion of ethylene to ethylene oxide by direct oxidation with elemental oxygen in the presence of such silver catalyst which comprises treating a water-soluble silver salt selected from the group consisting of silver nitrate and silver acetate with a hydroxide selected from the group consisting of sodium hydroxide, potassium hydroxide, barium hydroxide, tetramethyl ammonium hydroxide and ammonium hydroxide to precipitate silver oxide, coating a solid support with a slurry of said silver oxide and effecting the coating of the support at a temperature above 90° C. and below 100° C., drying the silver oxide coated support, and activating the silver oxide coated support catalyst in tubes using a liquid bath as the heating medium by maintaining the silver oxide coated support at a uniform temperature, i. e. a temperature which does not vary more than ±5° C., during the activation said temperature being with in the range of 250–340° C.

2. A method for preparing uniformly, highly active silver catalyst adapted for use in the conversion of ethylene to ethylene oxide by direct oxidation with elemental oxygen in the presence of such silver catalyst which comprises treating silver nitrate with sodium hydroxide to precipitate silver oxide, coating a solid support with a slurry of said silver oxide and effecting the coating of the support at a temperature of 95°±2° C., drying the silver oxide coated support, and activating the silver oxide coated support catalyst in tubes using a liquid bath as the heating medium by maintaining the silver oxide coated support at a uniform temperature, i. e. a temperature which does not vary more than ±5° C., during the activation said temperature being within the range of 285–315° C.

3. A method for preparing uniformly, highly active silver catalyst adapted for use in the conversion of ethylene to ethylene oxide by direct oxidation with elemental oxygen in the presence of such silver catalyst disposed in multitube pressure reactor maintained under higher superatmospheric pressure within the range of 100–250 p. s. i. g. which comprises treating a water-soluble silver salt selected from the group consisting of silver nitrate and silver acetate with a hydroxide selected from the group consisting of sodium hydroxide, potassium hydroxide, barium hydroxide, tetramethyl ammonium hydroxide and ammonium hydroxide to precipitate silver oxide, coating a solid carrier support of a size of about 1/8" to 1/2" with a slurry of said silver oxide and effecting the coating of the support at a temperature above 90° C. and below 100° C., drying the silver oxide coated support, and activating the silver oxide coated support catalyst by disposing the silver oxide coated support catalyst in the tubes of the multitube pressure reactor and heating the catalyst in the tubes with a liquid bath surrounding the tubes as the heating medium at a uniform temperature, i. e. a temperature which does not vary more than ±5° C., during the activation said temperature being within the range of 250–340° C.

4. A method for preparing uniformly, highly active silver catalyst adapted for use in the conversion of ethylene to ethylene oxide by direct oxidation with elemental oxygen in the presence of such silver catalyst disposed in multitube pressure reactor maintained under high superatmospheric pressure within the range of 150–250 p. s. i. g. which comprises treating silver nitrate with sodium hydroxide to precipitate silver oxide, coating a solid alumina carrier support of about 3/8" with a slurry of said silver oxide and effecting the coating of the support at a temperature of 95°±2° C., drying the silver oxide coated support, and activating the silver oxide coated support catalyst by disposing the silver oxide coated support catalyst in the tubes of the multitube pressure reactor and heating the catalyst in the tubes with a liquid bath surrounding the tubes as the heating medium at a uniform temperature, i. e. a temperature which does not vary more than ±5° C., during the activation said temperature being within the range of 285–315° C.

5. In a process for producing ethylene oxide which comprises continuously passing a gas mixture containing ethylene and oxygen in contact with a silver supported catalyst having a uniform activity disposed in a multitube pressure reactor at an elevated temperature between about 225° C. and 300° C. and under high superatmospheric pressure within the range of 100–250 p. s. i. g. to produce ethylene oxide, the improvement which comprises preparing said silver supported catalyst by treating a water-soluble silver salt selected from the group consisting of silver nitrate and silver acetate with a hydroxide selected from the group consisting of sodium hydroxide, potassium hydroxide, barium hydroxide, tetramethyl ammonium hydroxide and ammonium hydroxide to precipitate silver oxide, coating a solid carrier support of a size of about ⅛" to ½" with a slurry of said silver oxide and effecting the coating of the support at a temperature above 90° C. and below 100 C., drying the silver oxide coated support, and activating the silver oxide coated support catalyst by disposing the silver oxide coated support catalyst in the tubes of the multitube pressure reactor and heating the catalyst in the tubes with a liquid bath surrounding the tubes as the heating medium at a uniform temperature, i. e. a temperature which does not vary more than ±5° C., during the activation said temperature being within the range of 250–340° C.

6. In a process for producing ethylene oxide which comprises continuously passing a gas mixture containing ethylene and oxygen in contact with a silver supported catalyst having a uniform activity disposed in a multitube pressure reactor at an elevated temperature between about 225° C. and 300° C. and under high superatmospheric pressure within the range of 150–250 p. s. i. g. to produce ethylene oxide, the improvement which comprises treating silver nitrate with sodium hydroxide to precipitate silver oxide, coating a solid alumina carrier support of about ⅜" size with a slurry of said silver oxide and effecting the coating of the support at a temperature of 95°±2° C., drying the silver oxide coated support, and activating the silver oxide coated support catalyst by disposing the silver oxide coated support catalyst in the tubes of the multitube pressure reactor and heating the catalyst in the tubes with a liquid bath surrounding the tubes as the heating medium at a uniform temperature, i. e. a temperature which does not vary more than ±5° C., during the activation said temperature being within the range of 285–315° C.

References Cited in the file of this patent

UNITED STATES PATENTS

| | | |
|---|---|---|
| 2,125,333 | Carter | Aug. 2, 1938 |
| 2,238,474 | McNamee | Apr. 15, 1941 |
| 2,245,183 | Christ | June 10, 1941 |
| 2,294,383 | Carter | Sept. 1, 1942 |
| 2,367,169 | Gardner | Jan. 9, 1945 |
| 2,424,086 | Bergsteinsson | July 15, 1947 |
| 2,530,509 | Cook | Nov. 21, 1950 |
| 2,585,478 | Levy | Feb. 12, 1952 |
| 2,605,240 | Spears | July 29, 1952 |
| 2,653,952 | Egbert | Sept. 29, 1953 |
| 2,671,764 | Sacken | Mar. 9, 1954 |
| 2,693,474 | Egbert | Nov. 21, 1954 |

OTHER REFERENCES

Serial No. 290,077, Visser (A. P. C.), published April 20, 1943.